(12) United States Patent
Berthiaume

(10) Patent No.: US 7,225,892 B1
(45) Date of Patent: Jun. 5, 2007

(54) CVT FRAME MEMBER

(75) Inventor: Yves Berthiaume, Mont St-Hilaire (CA)

(73) Assignee: Bombardier Recreational Products Inc., Valcourt (CA)

( * ) Notice: Subject to any disclaimer, the term of this patent is extended or adjusted under 35 U.S.C. 154(b) by 0 days.

(21) Appl. No.: 10/762,521

(22) Filed: Jan. 23, 2004

(51) Int. Cl.
*B62D 61/00* (2006.01)
*B62K 11/00* (2006.01)
*B62M 9/00* (2006.01)
*B60K 17/00* (2006.01)

(52) U.S. Cl. .................. 180/230; 180/219; 180/291; 180/292

(58) Field of Classification Search ............. 180/219, 180/291, 292, 908, 230
See application file for complete search history.

(56) References Cited

U.S. PATENT DOCUMENTS

| | | | |
|---|---|---|---|
| 5,052,990 A * | 10/1991 | Sakakibara et al. ......... 475/210 |
| 6,454,031 B2 * | 9/2002 | Szymkowiak ............... 180/6.2 |
| 6,547,024 B2 * | 4/2003 | Ohyama et al. ............. 180/227 |
| 6,581,716 B1 * | 6/2003 | Matsuura ..................... 180/379 |
| 6,591,934 B2 * | 7/2003 | Tsutsumikoshi ............. 180/291 |
| 6,626,260 B2 * | 9/2003 | Gagnon et al. .............. 180/291 |
| 6,666,290 B2 * | 12/2003 | Yamauchi ................... 180/68.1 |
| 6,719,084 B2 * | 4/2004 | Kuji et al. ................... 180/309 |
| 6,725,962 B1 * | 4/2004 | Fukuda ........................ 180/292 |

* cited by examiner

*Primary Examiner*—Lesley D. Morris
*Assistant Examiner*—Marc A. Scharich
(74) *Attorney, Agent, or Firm*—Osler, Hoskin & Harcourt LLP

(57) ABSTRACT

A vehicle is described with a frame having a plurality of frame members. An engine and a straddle seat are disposed on the frame, the straddle seat accommodating a rider. A handlebar is disposed on the frame for steering the vehicle. A front suspension with at least one front wheel is disposed on the frame. A rear suspension is also disposed on the frame, the rear suspension having a rear swing arm pivotally connected to the frame and a shock absorber disposed between the frame and the rear swing arm. At least one rear is wheel disposed on the rear swing arm. A continuously variable transmission operatively connects the engine to the rear wheel. The continuously variable transmission includes a housing that acts as one of frame members.

19 Claims, 6 Drawing Sheets

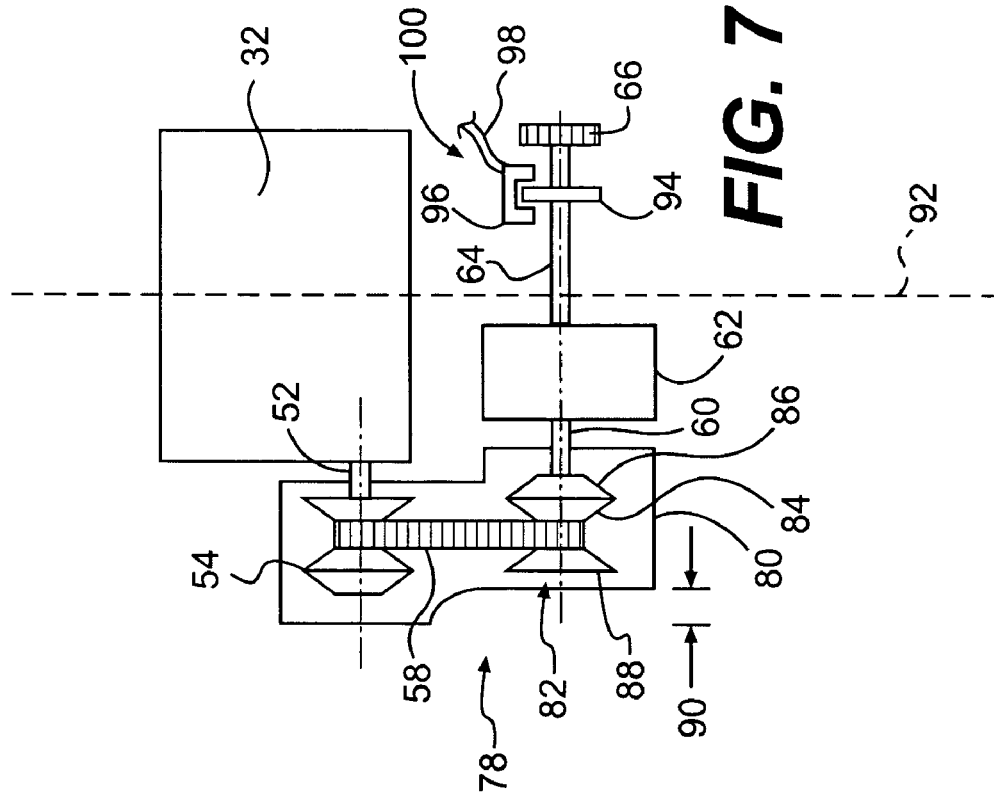
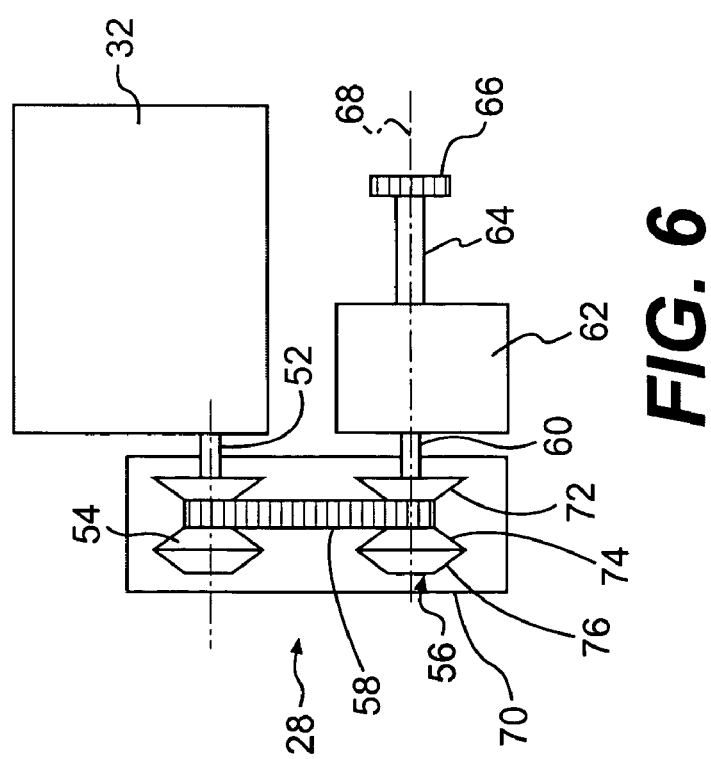

CVT FRAME MEMBER

FIELD OF THE INVENTION

The present invention relates to a frame member for a vehicle. In particular, the present invention relates to a frame member for a vehicle incorporating a continuously variable transmission ("CVT").

BACKGROUND OF THE INVENTION

Small motorcycles, more precisely scooters, incorporating a continuously variable transmission or CVT are well known in the art.

Often, on such two-wheeled vehicles, the CVT is packaged with the engine. This provides a practical layout where the engine and the CVT are provided as a unitary structure. Most of the time on scooters, the CVT casing acts as a swing arm for the suspension of the rear wheel. The CVT belt is located inside the swing arm, connecting both drive and driven pulleys of the CVT. With such a design, the rotational axis of the driven pulley is co-axially located on the axis of rotation of the rear tire.

One disadvantage with this design is that the packaging, although it is convenient, precludes a compact mechanical engine and CVT layout for the vehicle. This is because the swing arm extends toward the rear of the vehicle while the engine is positioned close to the center of gravity of the vehicle. Accordingly, the CVT is positioned a relatively far distance from the vehicle's center of gravity or CG. Since the CVT itself is a heavy component of the vehicle, this arrangement changes the center of gravity of the vehicle to a location that may not be optimal for performance of the vehicle.

Another disadvantage of incorporating the CVT casing as a part of the rear swing arm is that the unsprung weight of the vehicle is increased. It is well known in the art that the dynamic behavior of a vehicle improves when there is less unsprung weight. As a result, increasing the unsprung weight of the vehicle by incorporating the CVT into the rear swing arm negatively impacts on the operational performance of the vehicle, as would be appreciated by those skilled in the art.

In addition, as also is known to those skilled in the art, a compact arrangement for the engine and its transmission (the CVT) is desirable because the vehicle dynamic behavior is better when the mass of the CVT is centered close to the vehicle's center of gravity. Having the CVT casing at the rear of the vehicle is, therefore, not optimal.

There is, therefore, a need for an improved CVT-engine layout over the prior art.

In particular, there is a need, among others, for a compact vehicle construction with a CVT where the CVT does not contribute significantly to the unsprung weight of the vehicle.

SUMMARY OF THE INVENTION

The present invention brings a solution to the above-noted problems presented by prior art systems.

One aspect of the present invention provides a CVT completely supported by the suspension.

One other aspect of this invention provides a CVT casing that is structural and acts as a frame member, the CVT casing completely replacing one or more frame members found on a conventional vehicle.

Another aspect is to provide a vehicle where the CVT casing bears all of the weight transmitted through the frame.

An aspect of the present invention centers the CVT closer to the vehicle's center of mass.

An additional aspect of the invention provides a lighter frame because the CVT casing replaces one or more frame members found on conventional vehicles.

It is still another aspect of the invention to position the centrifugal clutch on the driven pulley so as to reduce the width of the engine/transmission layout.

On further aspect of the invention provides a gearbox connected on the driven pulley that is positioned on the vehicle so as to reduce the width of the engine/transmission layout.

It is, therefore, one aspect of the invention to provide a vehicle with a frame having a plurality of frame members. An engine, straddle seat, a front suspension and a rear suspension are disposed on the frame. A handlebar is also disposed on the frame for steering the vehicle. At least one front wheel is disposed on the front suspension and at least one rear wheel is disposed on the rear suspension. The rear suspension includes a rear swing arm pivotally connected to the frame and a shock absorber disposed between the frame and the rear swing arm. A continuously variable transmission operatively connects the engine to the rear wheel. The continuously variable transmission includes a housing that acts as at least one of the plurality of frame members.

It is still another aspect of the invention to provide a vehicle where the frame defines a storage bin between the handlebar and the seat that is sized to accommodate a helmet.

One further aspect of the invention provides a vehicle with a frame having a plurality of frame members. The vehicle includes a continuously variable transmission with a drive pulley, a driven pulley and a housing, the housing being one of the plurality of frame members. A gearbox is disposed proximal to the driven pulley. A centrifugal clutch is operatively connected to the driven pulley. An engine and a straddle seat are disposed on the frame. In addition, a handlebar is disposed on the frame for steering the vehicle. The vehicle also includes a front suspension disposed on the frame with at least a front wheel disposed on the front suspension. A rear suspension is disposed on the frame. A swing arm is pivotally mounted to the frame about a pivot axis. In addition, at least a rear wheel is disposed on the swing arm.

One addition aspect of the invention provides a vehicle with a frame including a plurality of frame members. An engine, and a straddle seat, and a handlebar are disposed on the frame. A front suspension with at least one front wheel is also disposed on the frame. A rear suspension, with at least one rear wheel, is also disposed on the frame. The rear suspension includes a shock absorber. The vehicle also includes a continuously variable transmission disposed on the frame. The continuously variable transmission is completely supported by the front suspension and the rear suspension. A swing arm is pivotally mounted to the frame about a pivot axis. In addition, the vehicle includes a frame member means for transmitting power from the engine to the wheel.

Other features of the present invention are described in the specifications and may be appreciated from the accompanying figures.

BRIEF DESCRIPTION OF THE DRAWINGS

The present invention will now be described in connection with the appended figures. Where appropriate, like reference numerals will be used to denote like parts, wherein:

FIG. 6 is a schematic illustration of the embodiment of the engine and CVT arrangement incorporated in the vehicle depicted in FIGS. 1–5; and FIG. 7 is a schematic illustration of an alternative embodiment of the engine and CVT arrangement encompassed by the invention.

DESCRIPTION OF EMBODIMENT(S) OF THE INVENTION

Figure 1:
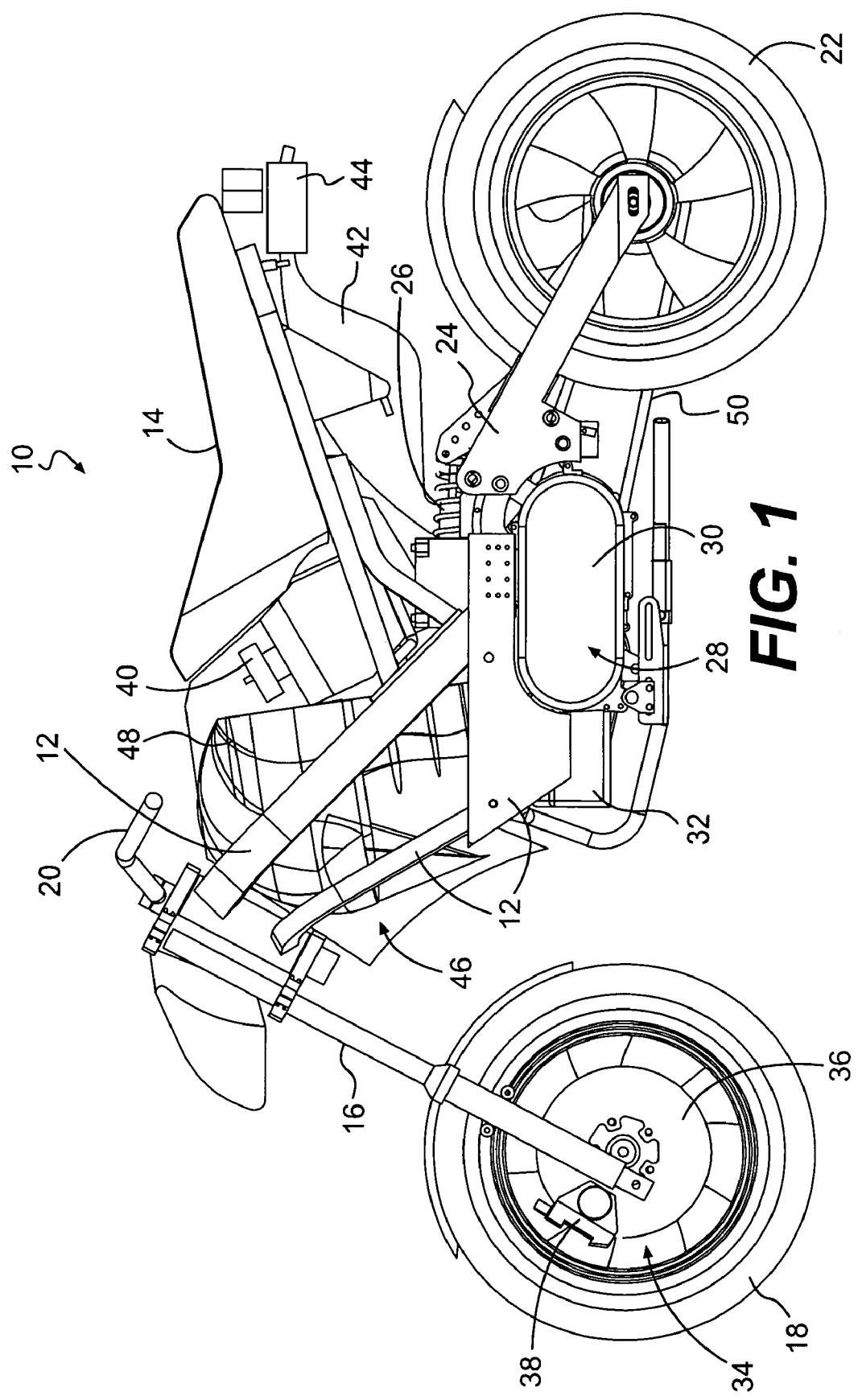
FIG. 1 is a left side view of a two-wheeled vehicle incorporating one embodiment of the invention.

FIG. 1 illustrates a two-wheeled vehicle 10 constructed in accordance with one embodiment of the present invention. The two-wheeled vehicle 10 includes a frame 12. A straddle-type seat 14 is disposed on the frame 12 and is constructed and arranged to accommodate at least one rider thereon, the driver of the vehicle 10. If a second rider accompanies the driver 10, the second rider, also referred to as a first passenger, will straddle the straddle-type seat in a position behind the driver.

The vehicle 10 includes a front suspension 16, which is a forked suspension typical for two-wheeled vehicles. A front wheel 18 is disposed on the front suspension 16. Handlebars 20 are connected to the front suspension 16 to provide steering control of the front wheel 18. While a forked front suspension is preferred for the invention, other constructions for the front suspension 16 may be employed without departing from the scope of the invention. For example, an asymmetrical front suspension may be employed where the support for the front wheel extends along only one side of the front wheel. In addition, while handlebars 20 are contemplated as the preferred steering control device, those skilled in the art would appreciate that other steering control devices, such as a steering wheel or joystick, may be used instead.

A rear wheel 22 is rotationally connected to a swing arm 24 that is pivotally connected to the frame 12. A shock absorber 26 is disposed between the swing arm 24 and the frame 12 to provide damping to the swing arm 24 as the vehicle 10 operates.

The vehicle 10 also includes a CVT 28 with a CVT casing 30 covering the operating components contained within. The CVT 28 is positioned on the left side of the vehicle 10, at a position toward the bottom of the frame 12 adjacent to the rear swing arm 24. As discussed in greater detail below, the CVT 28 acts as the transmission operatively connecting the engine 32 to the rear wheel 22.

The front wheel 18 includes a disk brake system 34. The disk brake system 34 includes a brake disk 36 connected to the front wheel 18 and a brake caliper 38 that acts on the brake disk to slow the vehicle 10. As part of the brake system 34, the rear wheel 22 also may be provided with a brake disk and brake caliper. Other braking arrangements also may be employed to act on the rear wheel, and one embodiment is discussed in greater detail below. In one preferred embodiment, operation of the brake system 34 follows conventional wisdom. One or both of the front and rear tires 18, 22 are controlled by a hand brake provided on the handlebars 20. A foot actuated brake is provided on the right ride of the vehicle 10 to apply braking power to the rear wheel 22 alone. Hand activated front and rear brakes are also suitable alternatives for the vehicle 10 of the present invention.

The vehicle 10 also includes a fuel tank 40 positioned beneath the seat 14. Exhaust from the engine 32 is carried by an exhaust system 42 to the rear of the vehicle 10 where it is expelled through one or more mufflers (or silencers) 44 positioned beneath the seat 14.

The frame 12 of the vehicle 10 is constructed and arranged to provide a helmet storage location 46 forward of the fuel tank 40, just behind the handlebars 20. The helmet storage location 46 is sized to accommodate one helmet 48 and, alternatively, may be used to store personal belongings as well.

Preferably, the vehicle 10 is powered by an internal combustion engine 32. The engine 32 may be either a two-stroke engine or a four-stroke engine, but a four-stroke engine is preferred because four-stroke engines are more quiet than two-stroke engines and produce fewer exhaust emissions, as a general rule. Moreover, four-stroke engines tend to be preferred by consumers more than two-stroke engines. Of course, as would be appreciated by those skilled in the art, other engine types, such as electric motors or fuel cells, may be employed instead of an internal combustion engine without departing from the scope of the invention.

Figure 2:
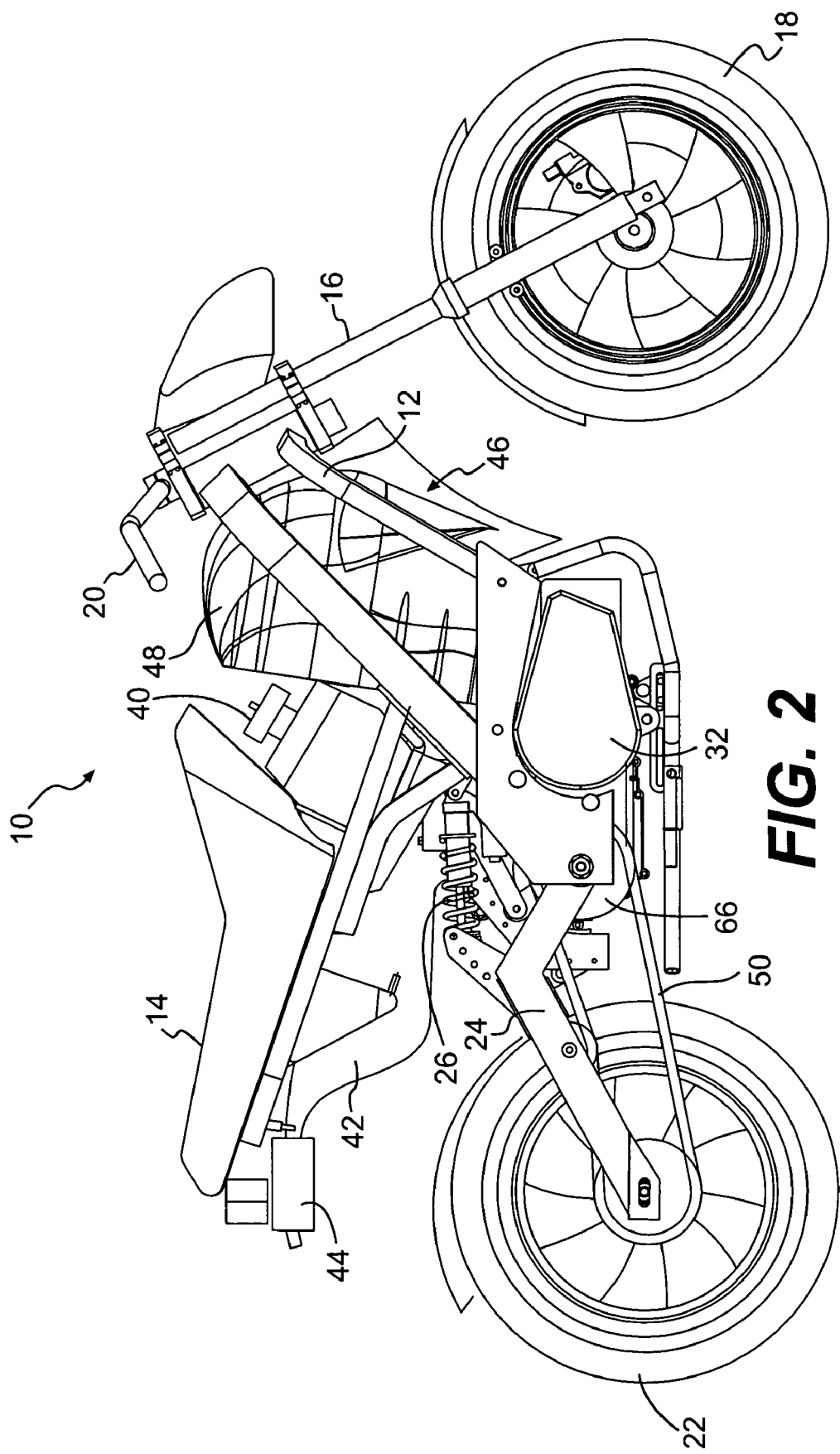
FIG. 2 is a right side view of the vehicle illustrated in FIG. 1.

As illustrated in FIG. 2, the engine 32 is operatively connected to the rear wheel 22 via a chain 50. As would be appreciated by those skilled in the art, a chain 50 is not the only operative connection that may be employed. Alternatively, a belt or drive shaft may be employed to operatively connect the engine 32 to the rear wheel 22.

Figure 3:
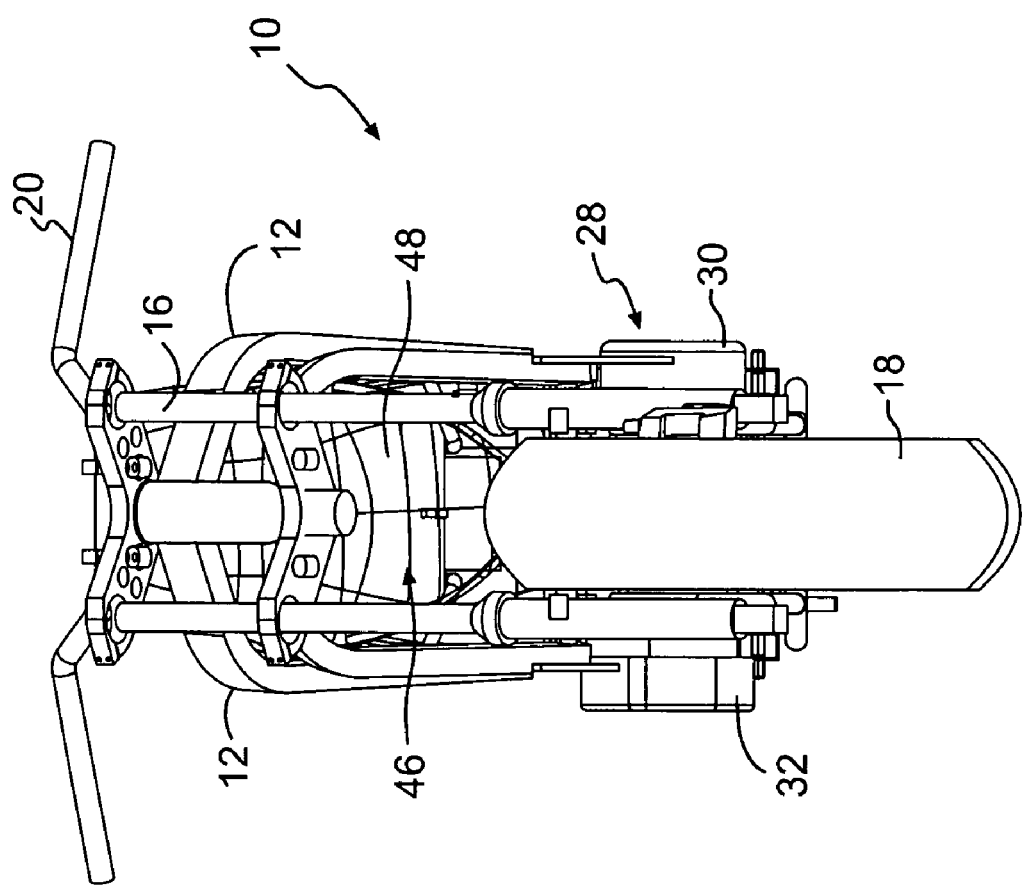
FIG. 3 is a front view of the vehicle illustrated in FIG. 1.
Figure 4:
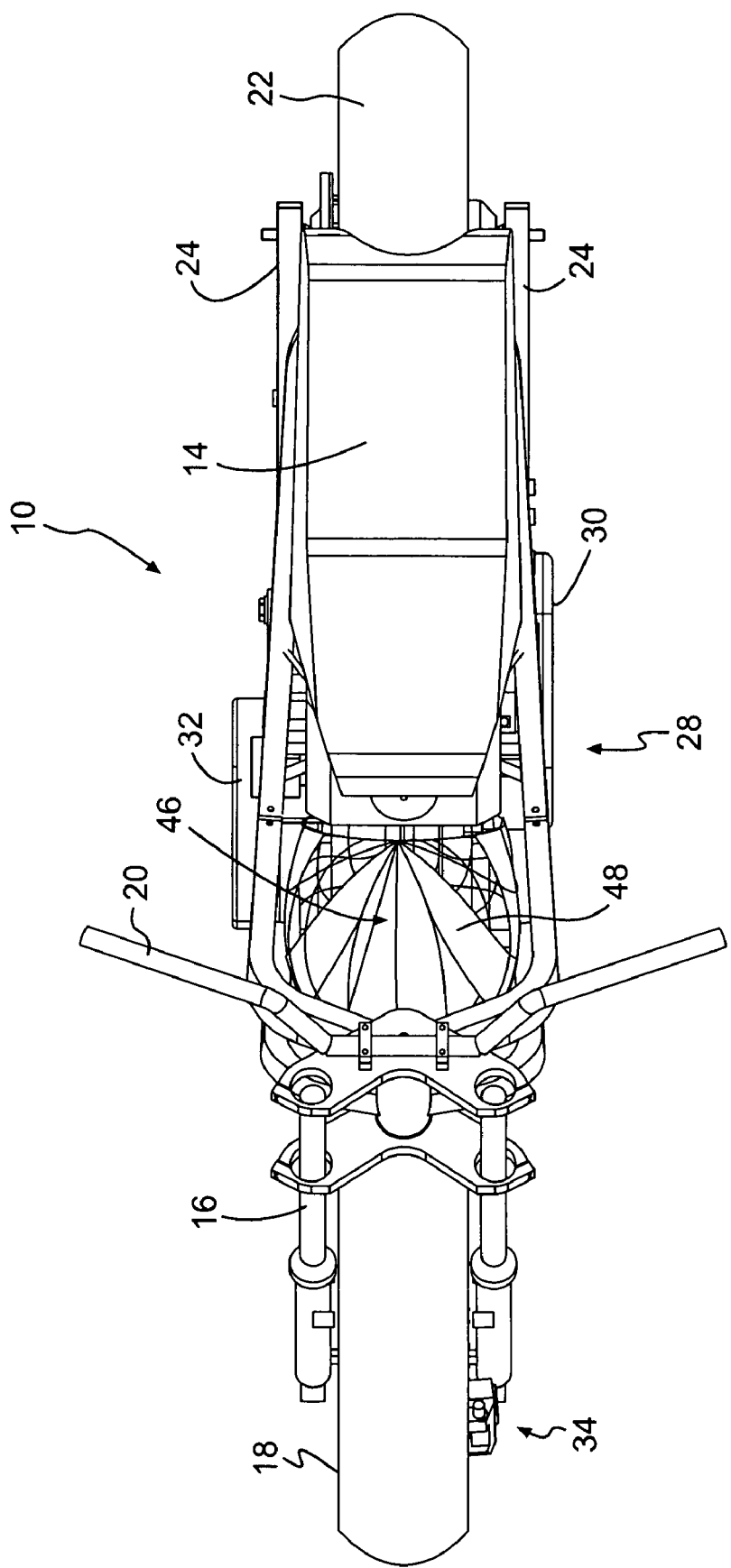
FIG. 4 is a top view of the vehicle illustrated in FIG. 1.

FIGS. 3 and 4 provide front and top views of the vehicle 10 of the invention. One aspect of the invention that these two drawings illustrate is the fact that the engine 32 and the CVT 28 are located at roughly the same height on the frame 12 as one another. So arranged, the vehicle 10 may be constructed so that the weight of the components are distributed evenly, providing the vehicle 10 with lateral symmetry. In other words, the positioning of the engine 32 and the CVT 28 preferably is such that the weight of the vehicle 10 is the same (or nearly the same) on both sides of the line of symmetry for the vehicle. This assures optimal or near optimal performance of the vehicle 10.

In addition, it is preferred occasionally that the engine 32 and the CVT 28 be positioned at the lowest-most portion of the frame 12 so that the center of gravity of the vehicle 10 is close to the ground as possible. A low center of gravity assists in optimal performance of the vehicle 10. In particular, if the center of gravity of the vehicle 10 is positioned proximal to the center of gravity of the rider, the dynamic behavior of the vehicle 10, especially when the vehicle 10 leans into a turn, may be enhanced.

Figure 5:
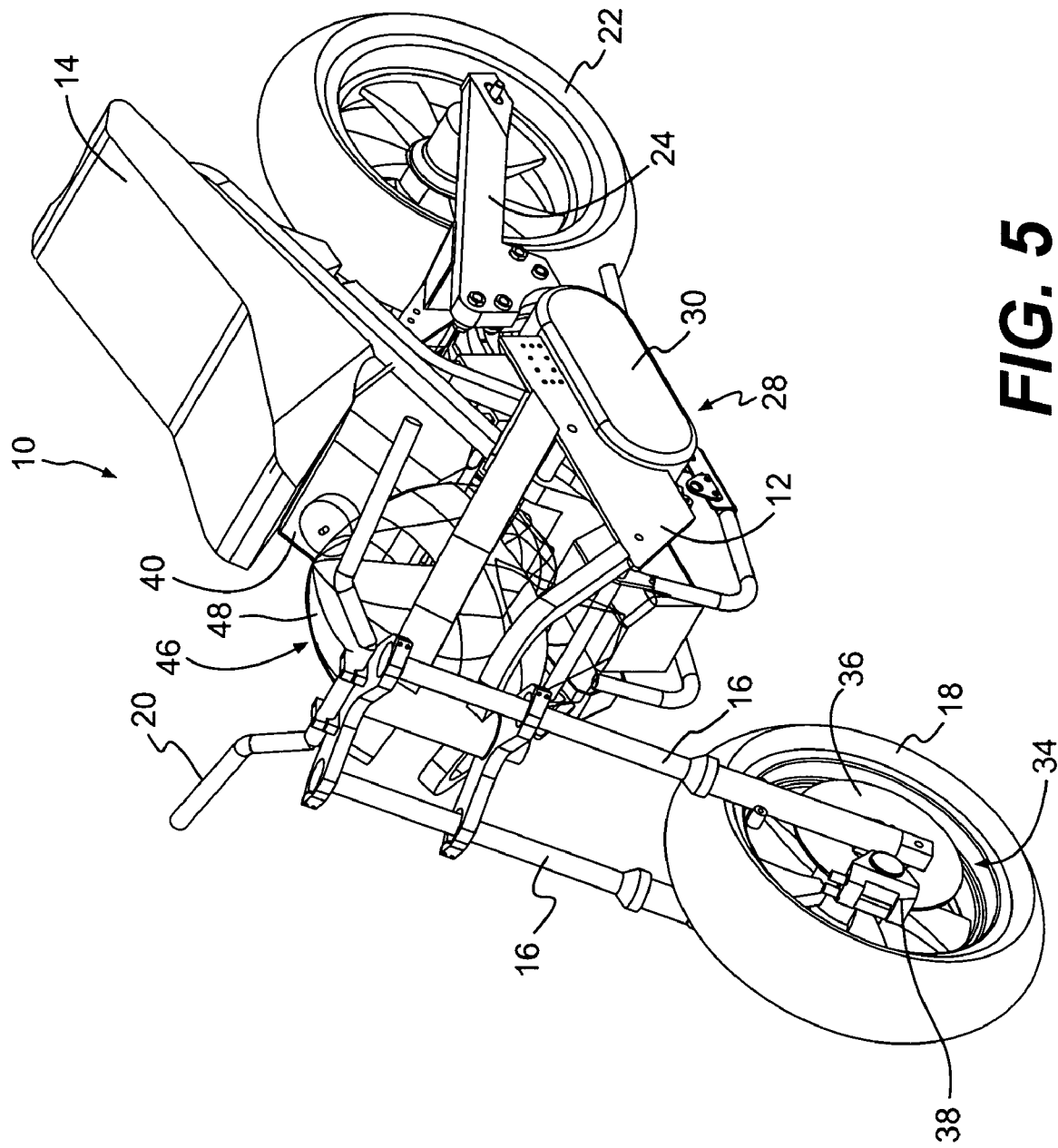
FIG. 5 is a perspective view of the vehicle illustrated in FIG. 1.

FIG. 5 is a perspective view of the vehicle 10 illustrated in FIGS. 1–4. This view provides additional details concerning the vehicle 10 of the invention and assists with a visual understanding of the layout of the vehicle 10.

FIG. 6 is a schematic illustration of the embodiment of the component arrangement for the vehicle 10 illustrated in FIGS. 1–5. The engine 32 is connected to the CVT 28 via the output shaft 52 from the engine 32. Preferably, the output shaft 52 connects to the drive pulley 54 within the CVT 28. The drive pulley 54, in turn, is connected to a driven pulley 56 via a belt 58, as would be appreciated by those skilled in the art. Motive power is transferred from the drive pulley 54 to the driven pulley 56 by the belt 58.

The driven pulley 56 is connected to an output shaft 60, which acts as an input shaft to a gearbox 62. The gearbox 62, in turn, has an output shaft 64 on which a sprocket 66 is disposed. The sprocket 66 transfers motive power from the gearbox 62 to the rear wheel 22 via the chain 50.

As would be appreciated by those skilled in the art, the CVT 28 operates to transfer the motive power from the engine 32 in a manner such that the rotational speed of the output shaft 52 from the engine 32 is reduced most of the time. As wide-open throttle, the ratio is about 1:1, typically varying between about 0.9:1 to 1.1:1. The gearbox 62 may is included to further augment the rotational speed of the CVT output shaft 60.

Separation of the gearbox 62 from the engine 32 also offers at least one further advantage. If the engine 32 is manufactured without a gearbox, the engine 32 may be constructed so that it is more compact than an engine incorporating a gearbox. As would be appreciated by those skilled in the art, a more compact arrangement provides the vehicle designer with greater flexibility. In addition, once provided as a separate component, the gearbox 62 may be positioned advantageously on the frame 12 so that the center of gravity of the vehicle 10, among other factors, is located to provide the vehicle 10 with optimal performance. In particular, in one preferred embodiment, the weight distribution of the engine 32, the gearbox 62, and the CVT 28 may be arranged more easily because they may be arranged in a more linear fashion, as illustrated in FIGS. 6 and 7.

As would be appreciated by those skilled in the art, the gearbox 62 need not be included in the vehicle 10 if the CVT 28 operates to provide the appropriate speed reduction to the shaft 64 prior to the power being transmitted to the rear wheel 22.

If included, the gearbox 62 may include any of a number of different gearing arrangements therein. In particular, the gearbox 62 may include standard reduction gearing that reduces the speed by a standard gearing ratio. Alternatively, the gearbox 62 may include planetary gearing to accomplish the same purpose. In yet another contemplated embodiment, the gearbox 62 may include a transmission that permits the driver of the vehicle 10 to select between several different reduction ratios (or gears), which is consistent with the operation of a manual transmission.

The gearbox output shaft 64 preferably is disposed at the pivot axis 68 of the rear swing arm 24. So constructed, the sprocket 66 is disposed on the rear swing arm pivot axis 68 so that the distance between the sprocket 66 and the rear wheel 22 is maintained as a fixed distance. Of course, as would be appreciated by those skilled in the art, the sprocket 66 need not be coaxial with the rear swing arm pivot axis 68, but may be displaced therefrom.

One aspect of the invention lies in the construction of the CVT housing 70 for the CVT 28. As shown schematically in FIG. 6, the CVT housing 70 encloses the drive pulley 54, the driven pulley 56 and the belt 58. The CVT housing 70 is connected to the frame in a manner such that the CVT housing 70 is a structural member or structural portion of the frame 12. The CVT housing 70 may be connected to the frame via several bolts or it may be welded to the frame 12. Other fasteners may be used as well, as would be appreciated by those skilled in the art.

As illustrated in FIG. 6, the driven pulley 56 of the CVT 28 includes two sheaves 72, 74. The outer sheave 74 is connected to a centrifugal clutch 76, which alters the distance between the inner and outer sheaves 72, 74, as would be appreciated by those skilled in the art. Specifically, the centrifugal clutch 76 cooperates with a ramp incorporated into the driven pulley 56 to cause the inner and outer sheaves 72, 74 to with respect to one another, increasing or decreasing the distance therebetween. Since the operation of the CVTs is well known, further description is not provided herein.

FIG. 7 schematically illustrates an alternative arrangement for a CVT 78. This embodiment is similar to the embodiment illustrated in FIG. 6. However, the CVT housing 80 is shaped differently from the CVT housing 70 shown in FIG. 6. In this embodiment, the driven pulley 82 is oriented such that the inner sheave 84 is connected to the centrifugal clutch 86 rather than the outer sheave 88. As a result, the CVT housing 80 surrounding the driven pulley 82 is displaced by a distance 90 with respect to the portion of the housing 80 surrounding the drive pulley 54. As would be appreciated by those skilled in the art, the centrifugal clutch 76, 86 incorporates a ramp that allows the centrifugal to operate. The ramp, therefore, is understood to be incorporated into the centrifugal clutch 76, 86.

The CVT 78 shown in FIG. 7 offers an advantage in that a portion of the housing 80, the driven pulley 82, and the gearbox 62 are all offset toward the centerline 92 of the vehicle 10 by the distance 90. As a result, the weight of these components is shifted by the distance 90, which assists with weight distribution of the components around the line of symmetry 92 of the vehicle 10.

FIG. 7 also illustrates one further aspect of the invention. In particular, a brake disk 94 is disposed on the gearbox output shaft 64. A brake caliper 96 is operatively connected to the brake disk 94 to apply a braking force to the brake disk 94. The brake caliper 96 may be operated hydraulically and, if so, a hydraulic line 98 connects to the brake caliper 96. The brake line 98 operatively connects to a brake actuator, which is disposed on the vehicle 10 for operation by the driver of the vehicle 10.

The brake disk 94 and brake caliper 96 comprise the basic components of a rear brake system 100 that is contemplated for use on the vehicle 10. Instead of providing a brake system for the rear wheel 22 that is like the brake system 34 for the front tire wheel 18, the rear brake system 100 operates on the gearbox output shaft 64 to apply braking force to the rear wheel 22. Alternatively, the rear brake system may be incorporated into the gearbox 62, as would be appreciated by those skilled in the art.

One advantage, among others, for locating the rear brake system 100 on the gearbox output shaft 64 lies in the positioning of the rear brake system 100 at a location other than at the rear wheel 22. With this arrangement, a brake line need not extend along the rear swing arm 24 to the rear wheel 22. Instead, the brake line and associated brake disk and brake caliper are located proximate to the frame. This offers a more simplified construction that locating the rear brake system on the rear wheel 22. It also makes possible various different constructions where the CVT housing does not act as the rear swing arm for the vehicle, which reduces the unsprung weight of the vehicle.

As would be appreciated by those skilled in the art, one advantage offered by the construction of the vehicle 10 of the present invention is the fact that the entire weight of the vehicle 10 at its rear end may be born by the CVT housing 70, 80 since the CVT housing 70, 80 forms one of the plurality of frame members comprising the vehicle 10. In other words, the rear swing arm 24 may be suspended from the CVT housing 70, 80 in this arrangement so that the load of the vehicle is transferred to the rear wheel 22 through the CVT housing 70, 80.

As illustrated in FIGS. 1–5, it is preferred that the CVT 28, 78 be positioned at the lowest-most portion of the frame 12 for the vehicle 10. With the CVT 28, 78 forming a part of the lowest-most portion of the frame 12, the weight of the CVT 28, 78 may be positioned advantageously so that the center of gravity of the vehicle is lowered as much as possible. As would be appreciated by those skilled in the art, a compact center of gravity improves the operation of the vehicle by improving its handling characteristics.

It is contemplated that the CVT housing 70, 80 which forms a part of the frame 12 will be manufactured as a separate component that is incorporated as one of the frame members during assembly of the vehicle 10. In particular, it is contemplated that the CVT 28, 78 may be purchased as a component by the vehicle manufacturer and incorporated into the frame 12. This offers the advantage that an off-the-shelf CVT 28, 78 may be incorporated into the vehicle 10, which may reduce the cost of manufacture of the vehicle 10.

One additional aspect of the invention lies in the fact that the engine 32, the CVT 28, and the gearbox 62 may be manufactured as a unitary component of the vehicle. It is contemplated that this may reduce the manufacturing cost of the vehicle 10.

In FIGS. 6 and 7, the engine 32, CVT 28, 78, and the gearbox 62 are illustrated as individual components that are disposed adjacent one another. As would be appreciated by those skilled in the art, other arrangements are possible within the scope of the invention. In one contemplated variation, for example, the engine 32, CVT 28, 78, and the gearbox 62 may be manufactured as single component of the vehicle and need not be separate components, as illustrated. In this regard, the CVT housing 70, 80 may be manufactured together with the remainder of the frame 12 so that the frame 12 presents a unitary construction.

While embodiments of the invention have been described and illustrated herein, it is contemplated that innumerable variations may be considered by those skilled in the art. The discussion of particular embodiments is not meant to be limiting of the invention in any way. To the contrary, the innumerable variations of the invention are intended to be encompassed by the scope of the invention, as evidenced by the claims appended hereto.

What is claimed is:

1. A vehicle comprising:
   a. a frame comprising a plurality of frame members;
   b. an engine disposed on the frame;
   c. a straddle seat disposed on the frame for accommodating a rider;
   d. a handlebar disposed on the frame for steering the vehicle;
   e. a front suspension disposed on the frame;
   f. at least a front wheel disposed on the front suspension;
   g. a rear suspension disposed on the frame, the rear suspension comprising a rear swing arm pivotally connected to the frame at a swing arm pivot axis and a shock absorber operatively disposed between the frame and the rear swing arm;
   h. at least one rear wheel disposed on the rear swing arm; and
   i. a continuously variable transmission operatively connecting the engine to the at least one rear wheel, the continuously variable transmission comprising:
      a housing that comprises at least one of the plurality of frame members; and
      a drive pulley and a driven pulley, the driven pulley comprising a centrifugal clutch and the driven pulley has a driven pulley axis,
      wherein the swing arm pivot axis is substantially aligned with the driven pulley axis.

2. The vehicle of claim 1, wherein the vehicle has only one front wheel and one rear wheel.

3. The vehicle of claim 1, wherein the vehicle has two front wheels and one rear wheel.

4. The vehicle of claim 1, wherein the vehicle has two front wheels and two rear wheels.

5. The vehicle of claim 1, wherein the frame members are separately manufactured.

6. The vehicle of claim 1, wherein the frame defines a storage bin between the handlebar and the seat that is sized to accommodate a helmet.

7. The vehicle of claim 1, wherein the driven pulley axis is coaxial with the swing arm pivot axis.

8. The vehicle of claim 1, wherein the housing is the lowest-most frame member.

9. A vehicle comprising:
   a. a frame comprising a plurality of frame members;
   b. a continuously variable transmission comprising a drive pulley, a driven pulley and a housing, the driven pulley having an axis and the housing comprising one of the plurality of frame members;
   c. a gearbox disposed proximal to the driven pulley;
   d. a centrifugal clutch operatively connected to the driven pulley, the centrifugal clutch having a center of rotation defining an axis, the axis being substantially coaxial with the driven pulley;
   e. an engine disposed on the frame;
   f. a straddle seat disposed on the frame for accommodating a rider;
   g. a handlebar disposed on the frame for steering the vehicle;
   h. a front suspension disposed on the frame;
   i. at least a front wheel disposed on the front suspension;
   j. a rear suspension disposed on the frame;
   k. a swing arm pivotally mounted to the frame about a pivot axis;
   l. at least a rear wheel disposed on the swing arm; and
   m. a brake, the brake having a center of rotation defining an axis, the axis being substantially coaxial with the driven pulley.

10. The vehicle of claim 9, wherein the gearbox is a planetary type gearbox.

11. The vehicle of claim 10, wherein the planetary type gearbox has a center of rotation defining an axis, the axis being substantially coaxial with the driven pulley axis.

12. The vehicle of claim 9, wherein the vehicle has only one front wheel and one rear wheel.

13. The vehicle of claim 9, wherein the vehicle has two front wheels and one rear wheel.

14. The vehicle of claim 9, wherein the vehicle has two front wheels and two rear wheels.

15. A vehicle comprising:
   a. a frame comprising a plurality of frame members;
   b. a continuously variable transmission comprising a drive pulley, a driven pulley and a housing, the driven pulley having an axis and the housing comprising one of the plurality of frame members;
   c. a gearbox disposed proximal to the driven pulley;
   d. a centrifugal clutch operatively connected to the driven pulley, the centrifugal clutch having a center of rotation defining an axis, the axis being substantially coaxial with the driven pulley;

e. an engine disposed on the frame;

f. a straddle seat disposed on the frame for accommodating a rider;

g. a handlebar disposed on the frame for steering the vehicle;

h. a front suspension disposed on the frame;

i. at least a front wheel disposed on the front suspension;

j. a rear suspension disposed on the frame;

k. a swing arm pivotally mounted to the frame about a pivot axis;

l. at least a rear wheel disposed on the swing arm; and m. a drive system including a drive sprocket and a driven sprocket, the drive sprocket having a center of rotation defining an axis, the axis being substantially coaxial with the driven pulley.

16. The vehicle of claim 15, wherein the vehicle has only one front wheel and one rear wheel.

17. The vehicle of claim 15, wherein the vehicle has two front wheels and one rear wheel.

18. The vehicle of claim 15, wherein the vehicle has two front wheels and two rear wheels.

19. The vehicle of claim 15, wherein the gearbox is a planetary type gearbox.

* * * * *